April 4, 1961 W. A. TUTHILL 2,978,067
ACTUATING MEANS FOR EXPANSIBLE FILTERS
Filed Feb. 5, 1957 3 Sheets-Sheet 1

INVENTOR
William A. Tuthill
BY
Kane, Dalsimer and Kane
ATTORNEYS

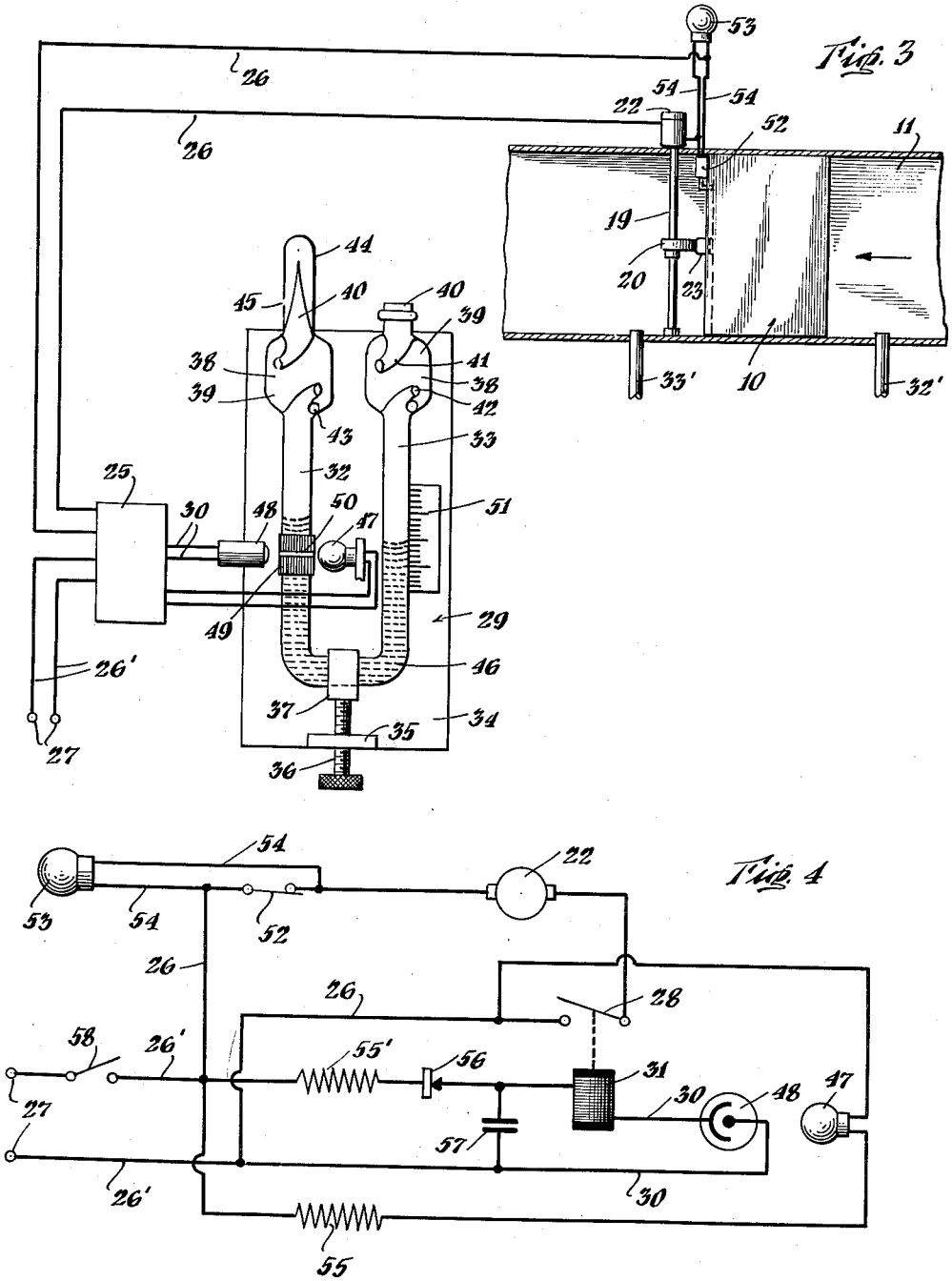

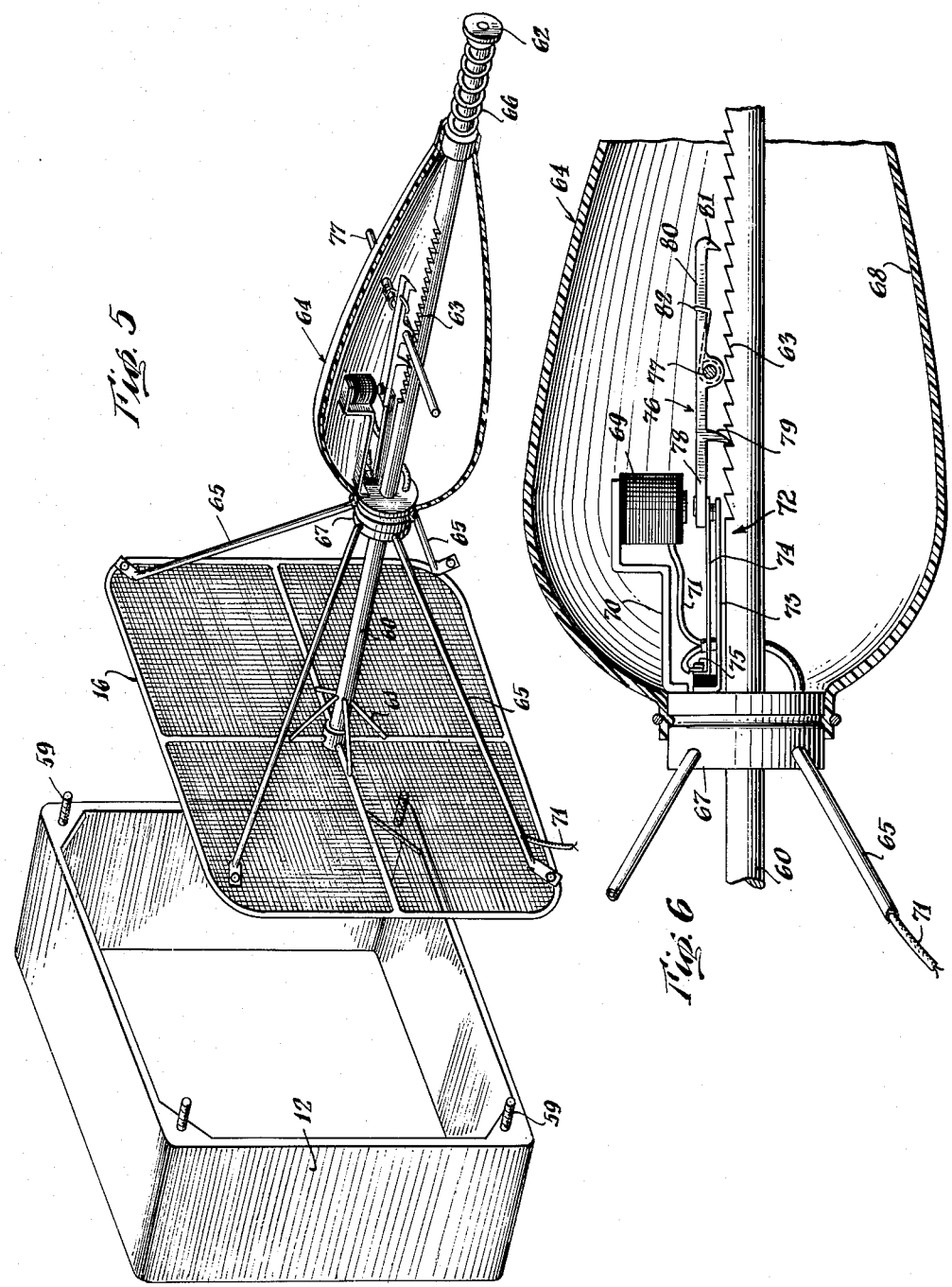

United States Patent Office 2,978,067
Patented Apr. 4, 1961

2,978,067

ACTUATING MEANS FOR EXPANSIBLE FILTERS

William Ansel Tuthill, Westhampton Beach, N.Y., assignor to Flanders Mill, Inc., Riverhead, N.Y., a corporation of New York Filed Feb. 5, 1957, Ser. No. 638,338

2 Claims. (Cl. 183—59)

This invention relates to expansible air filters, and more specifically to an apparatus for automatically expanding the same.

In recent years, technological advances, in many varied fields of endeavor, have made it necessary to develop new and improved types of air filters for extracting dust and other minute particles from the atmosphere. Among the types of filters developed is the variable compression or expansible filter. The expansible filter, as it will hereinafter be referred to, is of such design that the air, which is passed through it, must travel a tortuous path. Generally, the air enters the filter through some form of passageway which extends almost through the filter. At some point during its flow through this passageway, the air passes through the wall of the passageway into an adjacent parallel passageway, which opens at the rear of the filter. In this manner the air is filtered by the edge or surface areas of the passageways. Filters, of the type above described, may be referred to as sieve-type filters in that the filtering material is porous enough to permit the passage of air therethrough, but is of sufficient density to trap the impurities carried in the air.

The structure heretofore described is highly effective in its early stages of use, but as dust particles and other impurities build up and form a caked layer on the surface of the filter, the pressure drop across the filter increases rapidly. To overcome this problem, the edge type filter is designed to expand such that the layer of impurities is broken up and the filtering qualities are reestablished. In practical use the expansible filters may be expanded three or four times before it is necessary to discard them.

Though expansible filters are effective in removing impurities from the air, their use has been somewhat limited in that it is difficult to determine at what point the filter should be expanded. Further, it is difficult to expand the filter after such expansion is found necessary. Prior to this invention, the expansion of the filter was a manual operation which, as it will be understood, was extremely difficult when the filter was located in an air duct or in some other inaccessible place.

This invention overcomes the problems aforementioned with respect to expansible filters. It is an object of the invention to provide an expansion actuating device which will automatically expand the filter as the pressure drop across the filter increases. It is also an object of the invention to provide an expansible filter which will operate unattended, and automatically reestablish its air flow characteristics as such characteristics change due to impurity build-up on the filter surface. It is further an object of the invention to provide a device, for expanding a filter, which is pressure sensitive such that it reacts to pressure differentials between the front and rear surfaces of the filter.

With these and other objects in mind, reference is had to the attached sheet of drawings, illustrating one form of the invention, wherein like characters represent like parts, and in which:

Fig. 3 is a partial plan and partial schematic view illustrating the expansion actuating mechanism;

Fig. 4 is a schematic diagram illustrating the circuits involved in the expansion actuating mechanism;

Fig. 5 is an exploded perspective view illustrating an alternative form of expansion means; and Fig. 6 is an enlarged cross-sectional view showing in detail the structure of the periodic shifting means of the expansion mechanism of Fig. 5.

Figure 1:
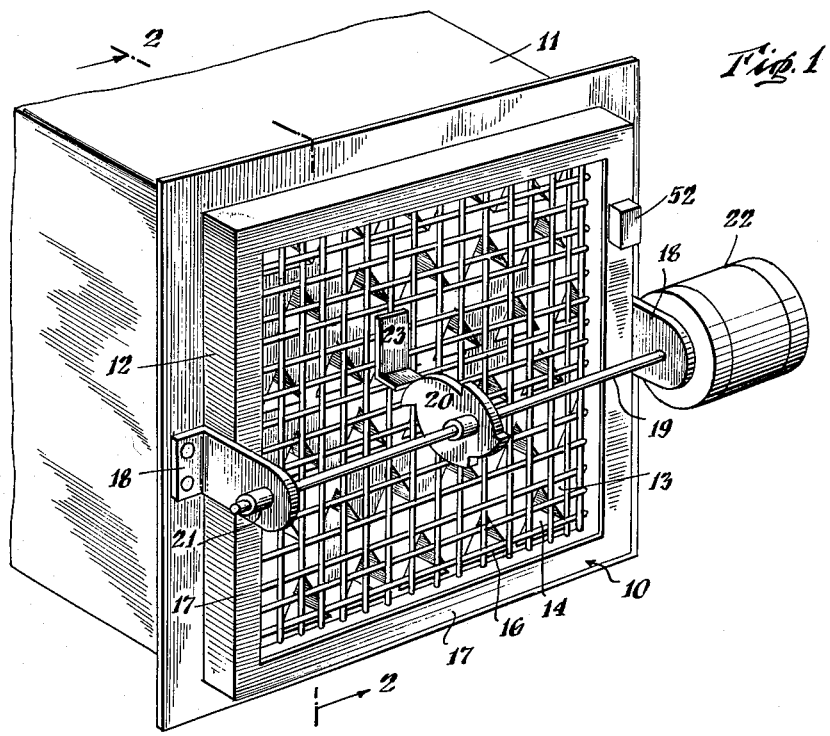
Fig. 1 is a perspective view of an expansible filter and an expansion actuating mechanism positioned within an air duct.
Figure 2:
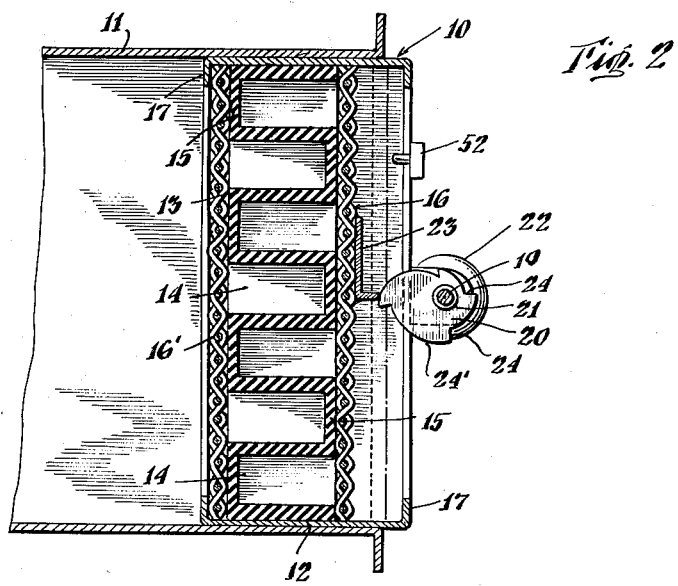
Fig. 2 is a cross-section of the structure shown in Fig. 1, taken in the direction of the arrows 2—2.

This invention, in its most simple embodiment, is a mechanism to expand a filter as the pressure on one side of the filter drops with respect to the pressure on the other side thereof. The invention includes a pressure sensitive device which actuates the expansion mechanism. In Figs. 1 and 2, one form of filter structure has been illustrated which may conveniently be associated with the actuating device of this invention. An expansion filter, which is generally indicated by the numeral 10, is shown positioned within an air-intake duct 11. A casing or frame 12 defines the outer surface of the expansible filter body and is adapted to house a resiliently compressible filter material 13. The filter material may conveniently be fibre glass, wool, cotton, felt, mineral wool or any other material which is suitable for the use to which the filter is directed. It is of such character, that on being released from compressed condition it will expand to completely fill the frame 12. The filter material 13 is provided with a plurality of parallel passageways 14, extending alternately from opposite faces thereof. Walls 15 define the ends of passageways 14. Screens or grids 16 and 16' are positioned within frame 12 adjacent the opposite faces of filter material 13, such grids acting to retain the filter material in compressed condition. Inwardly turned flanges 17 on frame 12 define the openings in the frame and act to retain the filter and grids therein.

The expansion actuating mechanism of the invention is designed to permit the expansion of the filter material, within the frame, as impurity build-up on the filter surfaces acts to increase the air pressure drop across the filter. One form of the expansion portion of the mechanism is best illustrated in Figs. 1 and 2. Brackets 18 are rigidly secured to duct 11 by means of rivets, or in any other manner known to the art. The brackets, of course, may be secured to frame 12 or positioned adjacent the filter in any other desirable manner. A cam drive shaft 19 is rotatably supported by brackets 18 and fixedly mounts, intermediate the brackets, a cam 20. Sleeves 21 secure shaft 19 against axial movement with respect to brackets 18. A motor 22 is operably connected to shaft 19 for rotating the shaft, and the cam 20 mounted thereon, in a manner to be hereinafter described and explained. A cam follower 23, which is rigidly secured to screen 16, defines in cross-section an L, and has its bottom or horizontal leg in camming association with cam 20. The filter material 13, which is compressed between the grids 16 and 16' tends to force such grids apart, thus retaining cam follower 23 in engagement with cam 20.

Referring now to Fig. 2, cam 20 is provided with four steps 24 intervening cam follower track 24' and, as shown, the distance between such steps and the axis of rotation of the cam decreases in a counter-clockwise direction. In operation, the filter 13 is initially compressed. As cam 20 rotates in a clockwise direction the cam follower 23 and the grid 16 are pressed toward the cam by the resiliently compressed filter material 13. The steps 24 of the cam cause the follower 23 to drop sharply from one portion of the cam follower track surface 24' to the next, this drop enabling the filter to expand with a snap.

The actuating portion of the expansion actuating mechanism is best understood by reference to Figs. 3 and 4. The motor 22, which forms part of the expansion portion of the mechanism, as above described, is connected through leads 26, a control box 25, leads 26' and terminals 27 to a source of current. A switch 28, which is normally open, intervenes such connection. A pressure sensitive device, generally indicated by the numeral 29, is connected by means of leads 30 to a solenoid 31, which acts to close switch 28.

The pressure sensitive device includes a U-shaped manometer tube, having legs 32 and 33, mounted on a plate 34. A tongue 35 is secured to plate 34 and has a threaded bore adapted to receive a threaded manometer adjusting rod 36. A gripping fork 37 is secured to rod 36 and is adapted to grip the base portion of the manometer. By means of the tongue, rod and fork, the manometer may be adjusted with respect to plate 34, for a purpose to be later described.

The leg 32 of the manometer is connected by a conduit (not shown), or in any manner known to the art, to a vent 32', outwardly of filter 10, such that it is substantially exposed to atmospheric pressure. The leg 33 is connected, in like manner, to vent 33' which opens in duct 11 inwardly of filter 10, whereby it is exposed to filtered air pressure. Blowout proof portions 38 define the outermost ends of legs 32 and 33. The portions 38 include bulbs 39, and nozzles 40 for connection to the conduits aforementioned. Within bulbs 39 are oppositely directioned spouts 41 and 42 which act to prevent the liquid within the manometer from overflowing through nozzles 40. Openings 43, adjacent the base of spouts 42 permit liquid, which has overflowed into bulb 39, to flow back into the manometer. In the manometer illustrated the nozzle 40 of leg 32 is shown with a capillary opening to prevent pressure surges from effecting the manometer balance. A cap or hood 44 having an opening 45 is shown associated with capillary nozzle 40 to protect such nozzle from the elements when it is exposed thereto. The capillary nozzle and cap 44 are only utilized when leg 32 is itself exposed to the elements.

A light impermeable liquid 46 is contained within the manometer for a purpose to be explained. A lamp 47 is positioned adjacent atmospheric pressure leg 32 and a light sensitive cell 48 is connected adjacent said leg opposite lamp 47. The cell 48 is electrically connected between the source of current and solenoid 31. A light impermeable sleeve 49, having an opening 50, embraces leg 32 between lamp 47 and cell 48 such that the light beam may pass therebetween when liquid 46 falls below the level of opening 50. A scale 51 is secured to plate 34 adjacent leg 33 of the manometer to measure pressure changes. The scale is adapted to indicate pressure change in tenths of inches of water.

In operation, the filter 10 is initially compressed, as aforedescribed, and the motor 22 is disconnected from the source of current by means of switch 28, which is open. The manometer is connected through legs 32 and 33 to indicate pressure changes inwardly of filter 10 with respect to air pressure outwardly thereof. The liquid 46 rises to substantially equal heights in legs 32 and 33 of the manometer, which is shifted with respect to plate 34, by means of rod 36 and fork 37, such that the liquid in leg 33 stands level with the zero mark on scale 51. The lamp 47 is connected to a source of current and its beam is shielded from cell 48 by liquid 46 and sleeve 49.

As air is passed through filter 10 a layer or crust of impurities builds up on the filtering surfaces increasing the pressure drop across the filter and thus lowering the filtered air pressure inwardly thereof. As the filtered air pressure is reduced, the air pressure, acting through leg 32, forces liquid 46 upwardly in leg 33, thereby lowering the liquid level in the former leg. When the filtered air pressure, inwardly of filter 10, has been reduced a sufficient amount, the liquid 46 in leg 32 drops below opening 50 in sleeve 49 and the beam from lamp 47 strikes cell 48. As the beam impinges on cell 48, solenoid 31 is energized. By means of the energized solenoid, switch 28 is closed and current flows to motor 22. In this manner, shaft 19 and cam 20 are rotated and the filter is expanded.

After filter 10 has been expanded, the pressure inwardly of the filter is again substantially in balance with the air pressure outwardly thereof and the liquid within the manometer returns to substantially equal heights within legs 32 and 33. The rise of liquid 46 within leg 32 breaks the light beam impinging on cell 48, and deenergizes solenoid 31, thereby opening switch 28 and disconnecting motor 22 from the source of current.

The expansion cycle, just described, is repeated as often as is necessary to retain the filter in operating condition. Fliters in present use may be expanded three or four times before it is necessary to discard them. In the embodiment of the invention illustrated a warning means has been provided to indicate complete expansion of the filter and to stop motor 22. A switch 52, which is normally closed, intervenes one lead 26 from motor 22. The switch, as can be best seen in Figs. 1 and 2, is secured to frame 12 and is of such character that on the full expansion of the filter the switch is opened. A warning and motor stop lamp 53 is connected to opposite sides of switch 52 by means of leads 54. When the filter expands and completely fills frame 12 a portion of grid 16 contacts switch 52 and opens the same. In this manner current is permitted to flow through lamp 53, causing a voltage drop in the circuit sufficient to stop motor 22 from operating. At the same time lamp 53, which may conveniently be located where a supervisor or other person can observe it, serves notice that the filter is fully expanded.

It should here be mentioned that the circuit shown in Fig. 4 includes a current limiting resistance 55 in series with lamp 47 and a current limiting resistance 55' in the circuit with cell 48. A rectifier 56 is also shown in the latter circuit as is a filtering condenser 57.

In order to more clearly explain the function of the circuit involved in the invention, particular reference is had to Fig. 4. On closing main switch 58, lamp 47 is lighted, but as afore explained, the beam from such lamp cannot impinge on cell 48. A current flows through cell 48, but due to the voltage drop within the cell, the current is not sufficient to energize solenoid 31. When the light beam from lamp 47, as a result of pressure change, impinges on cell 48 the voltage drop is, in effect, decreased and solenoid 31 is energized. The energized solenoid closes switch 28, which completes the circuit through leads 26 and motor 22. In this manner motor 22 is connected to the source of current such that shaft 19 and cam 20 are rotated. As previously explained, the expansion of the filter reestablishes the filtering qualities such that the air pressure inwardly and outwardly of the filter are again in substantial balance. The light beam between lamp 47 and cell 48 is broken and switch 28 is opened such that motor 22 is disconnected from the source of current. After the above cycle has been repeated the required number of times and filter 10 is completely expanded, switch 52 is opened, as previously described, and lamp 53 is lighted. The voltage drop across lamp 53 is sufficient to stop motor 22 from operating.

In Figs. 5 and 6 an alternative form of expansion mechanism has been shown. This device is less expensive to construct than the motor-cam mechanism of Figs. 1–4 and it provides supports which prevent the grid from tipping as the filter is expanded.

The frame 12 of the expansible filter is provided with a fixed bolt 59 at each of its corners. The grid 16 of the filter has rigidly secured thereto a shaft 60. Extending from shaft 60 and secured to grid 16 are stays or supports 61. These stays, which are positioned 90° apart, act to prevent the grid 16 from tipping with respect to shaft 60. The end of shaft 60, directed away from grid 16, is defined by an enlarged head 62. Intermediate head 62 and grid 16, the shaft 60 is provided with ratchet teeth, as at 63, for a purpose to be hereinafter explained. A periodic shifting means, generally indicated by the numeral 64, is slidably mounted on shaft 60 such that it substantially houses ratchet 63. Supports 65 extend from the forward portion of the shifting means 64 and are removably secured to bolts 59 on frame 12. In this manner grid 16 and the expansion mechanism are mounted on the expansible filter. A coil spring 66 embraces shaft 60 between shifting means 64 and head 62 such that, when the mechanism is mounted on frame 12, the grid 16 and shaft 60 tend to move outwardly thereof.

The periodic shifting means 64, which is best explained by reference to Fig. 6, comprises a collar 67 slidably mounted on shaft 60 and a resilient housing 68 secured thereto. A solenoid 69 is mounted on collar 67, within housing 68, by means of a bracket 70. The solenoid is connected to a source of current (not shown) through leads 71. A cutoff switch 72, which comprises a rigid arm 73 and a resilient arm 74, is mounted by means of a stud 75 on collar 67 and intervenes leads 71. A pawl 76 is pivotally mounted, within housing 68 by means of a shaft 77 which is rotatably supported through the walls of housing 68. The pawl 76 comprises an elongated arm 78 having a tooth 79 and a second arm 80 having a tooth 81. A spring 82, mounted on shaft 77, is secured to pawl 76 such that tooth 79 normally engages the teeth of ratchet 63 and elongated arm 78 engages resilient arm 74 of switch 72, thereby closing the same.

The circuit between solenoid 69 and the source of current is intervened by a light sensitive cell, a light and pressure sensitive device in the same manner as shown in Figs. 3 and 4. In operation, the tooth 79 of pawl 76 engages ratchet 63 such that shaft 60 moves inwardly of frame 12, compressing spring 66. As was previously described in connection with Figs. 1-4 the solenoid is energized when a pressure differential is created across the filter. The energization of solenoid 69 creates a magnetic field which draws elongated arm 78 into contact therewith such that tooth 79 disengages itself from ratchet 63. As arm 78 pivots toward the solenoid, the spring 62 forces shaft 60 and grid 16 outwardly of frame 12 and tooth 81 engages ratchet 63. In this manner the filter is expanded. When elongated arm 78 moves toward solenoid 69, resilient arm 74 of switch 72 is released from engagement with arm 73 and the circuit to the solenoid is thereby broken. On the deenergization of solenoid 69, spring 82 pivots pawl 76 such that tooth 81 is disengaged from ratchet 63 and tooth 79 is reengaged therewith. The elongated arm 78 engages resilient arm 74 to close switch 72. The cycle just described is repeated until the pressure differential across the filter decreases sufficiently to deenergize the solenoid by means of the light sensitive cell, as described with respect to the structure of Figs. 1-4.

It should here be noted that the filter may be expanded manually by means of shaft 77, to which pawl 76 is rigidly secured. The pawl is rocked to engage and disengage teeth 79 and 81 from ratchet 63 by merely rotating shaft 77 back and forth.

A warning light, to indicate complete expansion of the filter, may be associated with the alternative form of expansion controlling means in the same manner as previously described with respect to the structure of Figs. 1-4, or in any other manner known to the art.

Thus, among others, the several objects of the invention as aforenoted are achieved. Obviously numerous changes in construction and detail might be resorted to without departing from the spirit of the invention as defined by the claims.

I claim:

1. In combination with an expansible air filter having an upstream side face and a downstream side face, shiftable means coupled with and extending from said filter for permitting the expansion of said filter upon the shifting of said means, movable means operatively associated with a surface of said shiftable means and movable about an axis substantially parallel to a major portion of said upstream side face and downstream side face, said shiftable means and movable means being so constructed and arranged that their association upon movement of said movable means about said axis is adapted to effect the shifting of said shiftable means, said movable means comprises a cam having a cam follower track and steps intervening portions of said track and said shiftable means comprises a cam follower secured to said filter and in camming association with said cam whereby on rotation of said cam said cam follower will drop from one portion of said cam follower track to the next, electrical means coupled with said movable means for operating to move said movable means, and pressure sensitive actuating means coupled with said electrical means for energizing said electrical means when the air pressure on said upstream side face and at a second location provides a predetermined pressure differential to thereby cause said movable means to move and said shiftable means to shift in a direction substantially normal to one of the side faces of said filter.

2. In combination with an expansible air filter having an upstream side face and a downstream side face, shiftable means coupled with and extending from said filter for permitting the expansion of said filter upon the shifting of said means, movable means operatively associated with a surface of said shiftable means and movable about an axis substantially parallel to a major portion of said upstream side face and downstream side face, said shiftable means and movable means being so constructed and arranged that their association upon movement of said movable means about said axis is adapted to effect the shifting of said shiftable means, electrical means coupled with said movable means for operating to move said movable means, pressure sensitive actuating means coupled with said electrical means for energizing said electrical means when the air pressure on said upstream side face and at a second location provides a predetermined pressure differential to thereby cause said movable means to move and said shiftable means to shift in a direction substantially normal to one of the side faces of said filter, said pressure sensitive actuating means comprises a U-shaped manometer having one leg thereof adapted to be exposed to the air pressure at said upstream side face and the other leg thereof exposed to the air pressure at said second location, and a light-impermeable liquid within said manometer, and said electrical means includes a lamp secured adjacent one side of said one leg of said manometer and a light sensitive cell secured adjacent the opposite side of said one leg, said light-impermeable liquid being adapted to be disposed between said lamp and said cell in said one leg, and said electrical means being adapted to be energized when the liquid in said one leg drops such that a beam from said lamp impinges on said cell.

References Cited in the file of this patent

UNITED STATES PATENTS

| 1,379,056 | Smith | May 24, 1921 |
| 1,480,399 | Kling et al. | Jan. 8, 1924 |
| 1,969,627 | Simon et al. | Aug. 7, 1934 |
| 2,077,572 | Lofgren | Apr. 20, 1937 |
| 2,633,206 | Bruckner | Mar. 31, 1953 |
| 2,645,303 | Meyerhoefer | July 14, 1953 |
| 2,807,330 | Rivers | Sept. 24, 1957 |

FOREIGN PATENTS

| 2,737 | Great Britain | July 9, 1878 |